United States Patent
Guo et al.

(10) Patent No.: US 11,398,102 B1
(45) Date of Patent: Jul. 26, 2022

(54) METHOD FOR RECOGNIZING FINGERPRINT

(71) Applicant: InnoLux Corporation, Miao-Li County (TW)

(72) Inventors: Ming-Chi Guo, Miao-Li County (TW); Hsing-Yuan Hsu, Miao-Li County (TW); Po-Yang Chen, Miao-Li County (TW); I-An Yao, Miao-Li County (TW)

(73) Assignee: INNOLUX CORPORATION, Chu-Nan (TW)

( * ) Notice: Subject to any disclaimer, the term of this patent is extended or adjusted under 35 U.S.C. 154(b) by 0 days.

(21) Appl. No.: 17/215,877

(22) Filed: Mar. 29, 2021

(51) Int. Cl.
*G06V 40/13* (2022.01)
*G09G 3/20* (2006.01)
*G02F 1/1333* (2006.01)
*G02F 1/1335* (2006.01)

(52) U.S. Cl.
CPC ........... *G06V 40/13* (2022.01); *G09G 3/2003* (2013.01); *G02F 1/13338* (2013.01); *G02F 1/133512* (2013.01); *G09G 2300/0452* (2013.01); *G09G 2320/062* (2013.01); *G09G 2354/00* (2013.01)

(58) Field of Classification Search
CPC .................. G06V 40/13; G09G 3/2003; G09G 2300/0452; G09G 2320/062; G09G 2354/00; G02F 1/13338; G02F 1/133512
See application file for complete search history.

(56) References Cited

U.S. PATENT DOCUMENTS

| | | | |
|---|---|---|---|
| 2019/0139480 A1* | 5/2019 | Jin | H01L 27/156 |
| 2020/0042762 A1* | 2/2020 | Fu | H04N 5/35536 |
| 2021/0397814 A1* | 12/2021 | Choi | G06F 3/0421 |
| 2021/0406505 A1* | 12/2021 | Hai | G06F 3/0412 |

FOREIGN PATENT DOCUMENTS

KR 101279275 B1 6/2013

* cited by examiner

*Primary Examiner* — Premal R Patel
(74) *Attorney, Agent, or Firm* — Muncy, Geissler, Olds & Lowe, P.C.

(57) ABSTRACT

A method for recognizing a fingerprint of a subject includes the following steps: providing a display device, which includes: a plurality of fingerprint recognition units, a plurality of first sub-pixel regions with a first color, a plurality of second sub-pixel regions with a second color, and a plurality of third sub-pixel regions with a third color, wherein the first color, the second color, and the third color are different; defining a recognition area by disposing a finger of the subject on the display device when the display device is in a fingerprint recognition mode; and enabling at least one of the plurality of first sub-pixel regions disposed in the recognition area, and disabling at least one of the plurality of second sub-pixel regions and the plurality of third sub-pixel regions disposed in the recognition area when the display device is in the fingerprint recognition mode.

6 Claims, 5 Drawing Sheets

METHOD FOR RECOGNIZING FINGERPRINT

BACKGROUND

1. Field

The present disclosure relates to a method for recognizing a fingerprint of a subject.

2. Description of Related Art

The applications of the display devices are numerous, such as mobile phones, notebook computers, video cameras, still cameras, music displays, mobile navigators, and TV sets.

With the continuous advancement of technologies related to the display devices, the display devices not only have the display functions, but also have other functions. For example, the display device integrated with fingerprint recognition units are developed nowadays. If the fingerprint recognition unit is disposed in the pixel region, a part of the pixel region has to be used to dispose the fingerprint recognition unit, resulting in the brightness of the display device reduced. Thus, some blue sub-pixel regions may be replaced by the white sub-pixel regions to increase the brightness of the display device, but this kind of display device may have the problem of poor fingerprint recognition.

Therefore, it is desirable to provide a novel method for fingerprint recognition to increase the accuracy of the fingerprint recognition.

SUMMARY

The object of the present disclosure is to provide a method for recognizing a fingerprint of a subject, which comprises the following steps: providing a display device, wherein the display device comprises: a plurality of fingerprint recognition units, a plurality of first sub-pixel regions with a first color, a plurality of second sub-pixel regions with a second color, and a plurality of third sub-pixel regions with a third color, wherein the first color, the second color, and the third color are different; defining a recognition area of the display device by disposing a finger of the subject on the display device when the display device is in a fingerprint recognition mode; and enabling at least one of the plurality of first sub-pixel regions disposed in the recognition area, and disabling at least one of the plurality of second sub-pixel regions and the plurality of third sub-pixel regions disposed in the recognition area when the display device is in the fingerprint recognition mode.

Other novel features of the disclosure will become more apparent from the following detailed description when taken in conjunction with the accompanying drawings.

DETAILED DESCRIPTION OF EMBODIMENT

Figure 1:
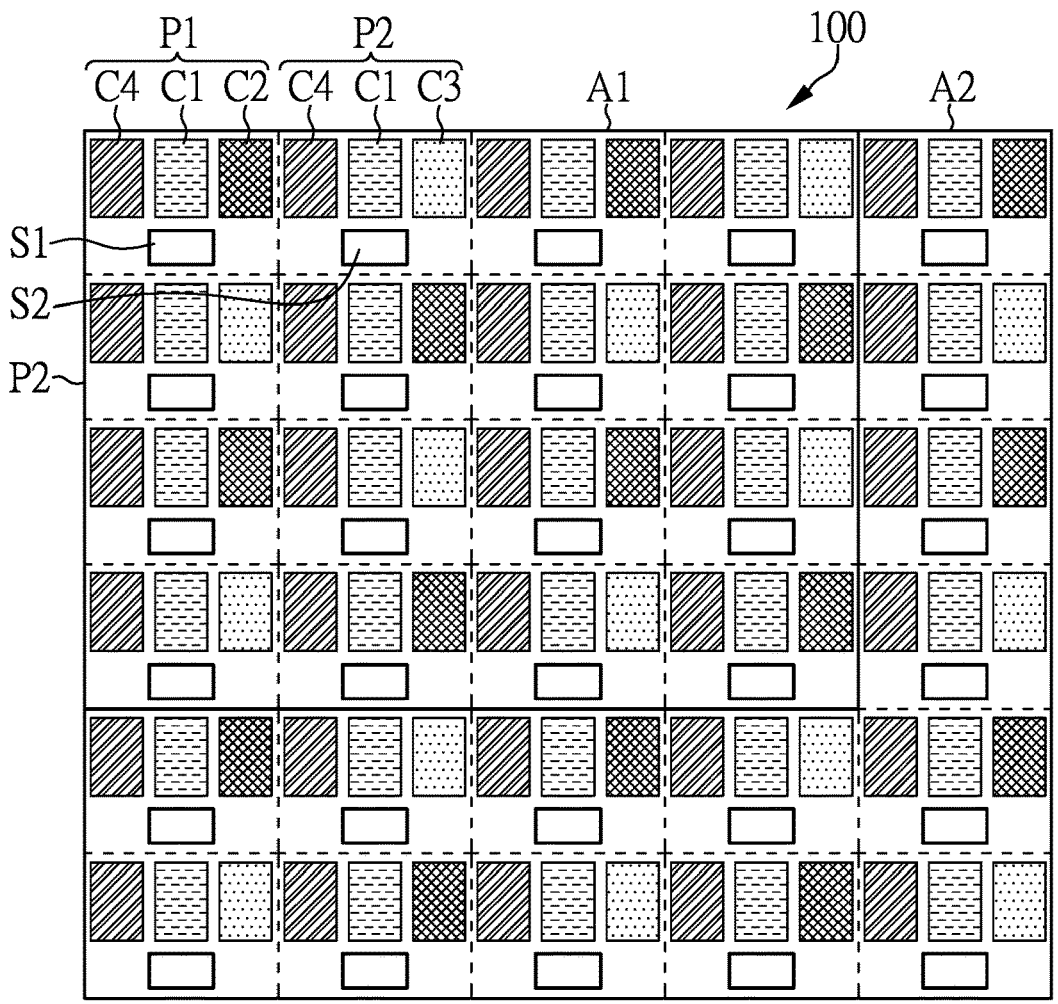
FIG. 1 is a schematic view of a display device according to one embodiment of the present disclosure.

Different embodiments of the present disclosure are provided in the following description. These embodiments are meant to explain the technical content of the present disclosure, but not meant to limit the scope of the present disclosure. A feature described in an embodiment may be applied to other embodiments by suitable modification, substitution, combination, or separation.

It should be noted that, in the present specification, when a component is described to comprise an element, it means that the component may comprise one or more of the elements, and it does not mean that the component has only one of the element, except otherwise specified.

Moreover, in the present specification, the ordinal numbers, such as "first" or "second", are used to distinguish a plurality of elements having the same name, and it does not means that there is essentially a level, a rank, an executing order, or an manufacturing order among the elements, except otherwise specified. A "first" element and a "second" element may exist together in the same component, or alternatively, they may exist in different components, respectively. The existence of an element described by a greater ordinal number does not essentially means the existence of another element described by a smaller ordinal number.

In the present specification, except otherwise specified, the feature A "or" or "and/or" the feature B means the existence of the feature A, the existence of the feature B, or the existence of both the features A and B. The feature A "and" the feature B means the existence of both the features A and B. The term "comprise(s)", "comprising", "include(s)", "including", "have", "has" and "having" means "comprise(s)/comprising but is/are/being not limited to".

Moreover, in the present specification, the terms, such as "top", "upper", "bottom", "front", "back", or "middle", as well as the terms, such as "on", "above", "over" "under" "below", or "between" are used to describe the relative positions among a plurality of elements, and the described relative positions may be interpreted to include their translation, rotation, or reflection.

Furthermore, the terms recited in the specification and the claims such as "above", "over", or "on" are intended not only directly contact with the other element, but also intended indirectly contact with the other element. Similarly, the terms recited in the specification and the claims such as "below", or "under" are intended not only directly contact with the other element but also intended indirectly contact with the other element.

Furthermore, the terms recited in the specification and the claims such as "connect" is intended not only directly connect with other element, but also intended indirectly connect and electrically connect with other element.

In the present specification, except otherwise specified, the terms (including technical and scientific terms) used herein have the meanings generally known by a person skilled in the art. It should be noted that, except otherwise specified in the embodiments of the present disclosure, these terms (for example, the terms defined in the generally used dictionary) should have the meanings identical to those known in the art, the background of the present disclosure or the context of the present specification, and should not be read by an ideal or over-formal way.

Figure 2:
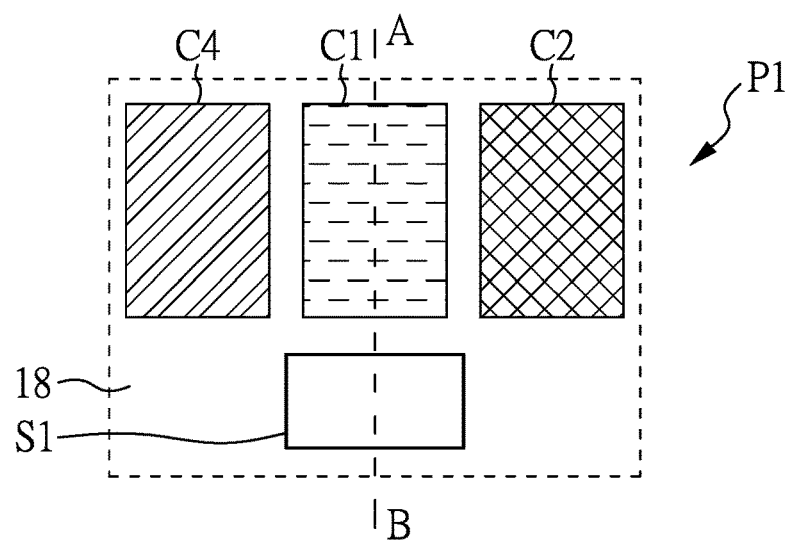
FIG. 2 is a schematic view of one pixel region in a display device according to one embodiment of the present disclosure.

FIG. 1 is a schematic view of a display device, and FIG. 2 is a schematic view of one pixel region in the display device of FIG. 1 according to one embodiment of the present disclosure. For easy of explanation, FIG. 1 only shows a portion of the display device 100.

As shown in FIG. 1 and FIG. 2, the display device 100 comprises: a plurality of fingerprint recognition units S1, S2, a plurality of first sub-pixel regions C1 with a first color, a plurality of second sub-pixel regions C2 with a second color, and a plurality of third sub-pixel regions C3 with a third color. The first color, the second color, and the third color can be different. The first color can be green or red, but is not limited thereto. The second color can be blue, but is not limited thereto. The third color can be a color brighter than the first color and the second color. For example, the third color can be white or yellow, but is not limited thereto. According to some embodiments, the fingerprint recognition units S can be used to receive light for fingerprint recognition.

When a finger of a subject (for example, a user) is disposed on, for example, touches on, the display device, a recognition area A1 of the display device 100 is defined, and the display device 100 can be in the fingerprint recognition mode. That is, the recognition area A1 is an area where the fingerprint of the subject is to be recognized. When the display device is in a fingerprint recognition mode, the recognition area A1 can be touched by the subject, and the fingerprint recognition can be sensed. Referring to FIG. 1, a non-recognition area A2 can be the area outside the recognition area A1.

According to some embodiments, the display device can include a plurality of fourth sub-pixel regions C4 with a fourth color. The first color, the second color, the third color, and the fourth color can be different. Referring to FIG. 1 and FIG. 2, the display device 100 includes a first pixel region P1 (indicated by the dash lines) and a second pixel region P2 (indicated by the dash lines). The first pixel region P1 and the second pixel region P2 are disposed in the recognition area A1. According to some embodiments, the second pixel region P2 can be adjacent to the first pixel region P1, but the present disclosure is not limited thereto. The first pixel region P1 includes a first fingerprint recognition unit S1 of the plurality of fingerprint recognition units, a first sub-pixel region C1 of the plurality of first sub-pixel regions, a second sub-pixel region C2 of the plurality of second sub-pixel regions, and a fourth sub-pixel region C4 of the plurality of fourth sub-pixel regions. The second pixel region P2 includes a second fingerprint recognition unit S2 of the plurality of fingerprint recognition units, a first sub-pixel region C1 of the plurality of first sub-pixel regions, a third sub-pixel region C3 of the plurality of third sub-pixel regions, and a fourth sub-pixel region C4 of the plurality of fourth sub-pixel regions.

The sub-pixels included in the first pixel region P1 and the sub-pixels included in the second pixel region P2 can be different. When the display device is in the recognition mode, if all the sub-pixels in the first pixel region P1 and all the sub-pixels in the second pixel region P2 are turned on (enabled), the light emitted from the first pixel region P1 and the light emitted from the second pixel region P2 can be different. Thus, the fingerprint recognition unit S1 in the first pixel region P1 and the fingerprint recognition unit S2 in the second pixel region P2 will receive different light, thus affecting recognition accuracy.

According to some embodiments, when the display device is in the recognition mode, not all sub-pixels in the first pixel region P1 and in the pixel region P2 are turned on (enabled). For example, when the display device is in the fingerprint recognition mode, at least one of the plurality of first sub-pixel regions C1 disposed in the recognition area A1 is enabled, and at least one of the plurality of second sub-pixel regions C2 and the plurality of third sub-pixel regions C3 disposed in the recognition area A1 is disabled. In this way, light emitted from different pixel regions can be controlled to be similar or the same. Specifically, the light received by the first fingerprint recognition unit S1 and the light received by the second fingerprint recognition unit S2 can be controlled to be similar or the same. Thus, recognition accuracy can be improved.

Referring to FIG. 1, according to some embodiment, when the display device is in the fingerprint recognition mode, the at least one the plurality of fourth sub-pixel regions C4 disposed in the recognition area can be enabled. According to some embodiment, when the display device is in the fingerprint recognition mode, the at least one the plurality of fourth sub-pixel regions C4 disposed in the recognition area can be disabled.

Herein, enabling the sub-pixel region means that the sub-pixel region is driven by a driving unit (for example, a transistor). According to some embodiments, when the display device is a LCD display device, the sub-pixel region is in a bright state when this sub-pixel region is enabled and the sub-pixel region is in a dark state when this sub-pixel region is disabled. According to some embodiments, when the display device is a LED or OLED display device, the diode in the sub-pixel region can emit light when this sub-pixel region is enabled and the diode in the sub-pixel region does not emit light when this sub-pixel region is disabled.

Figure 3:
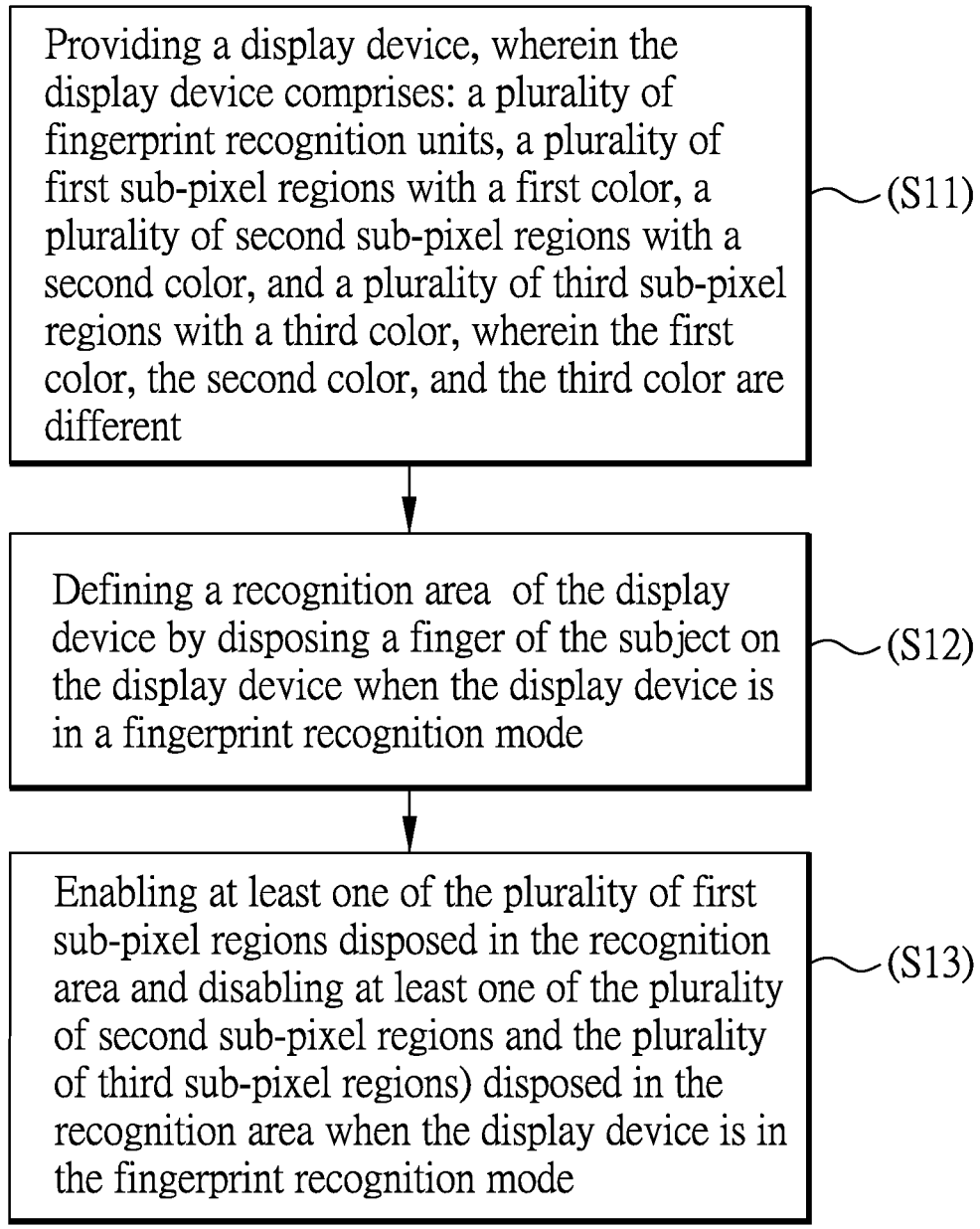
FIG. 3 is a block diagram showing a method for the fingerprint recognition according to one embodiment of the present disclosure.

FIG. 3 is a block diagram showing a method for recognizing a fingerprint of a subject according to one embodiment of the present disclosure.

In step (S11), the display device 100 shown in FIG. 1 is provided. The display device 100 can include a plurality of fingerprint recognition units S1, S2, a plurality of first sub-pixel regions C1 with a first color, a plurality of second sub-pixel regions C2 with a second color, and a plurality of third sub-pixel regions C3 with a third color, wherein the first color, the second color, and the third color are different. Herein, the first color, the second color and the third color are defined above, and are not repeated again.

In step (S12), a recognition area A1 of the display device is defined by disposing a finger of the subject (for example, to touch) on the display device when the display device is in a fingerprint recognition mode.

In step (S13), when the display device is in the fingerprint recognition mode, at least one of the plurality of first sub-pixel regions C1 disposed in the recognition area A1 is enabled, and at least one of the plurality of second sub-pixel regions C2 and the plurality of third sub-pixel regions C3 disposed in the recognition area A1 is disabled.

Figure 4:
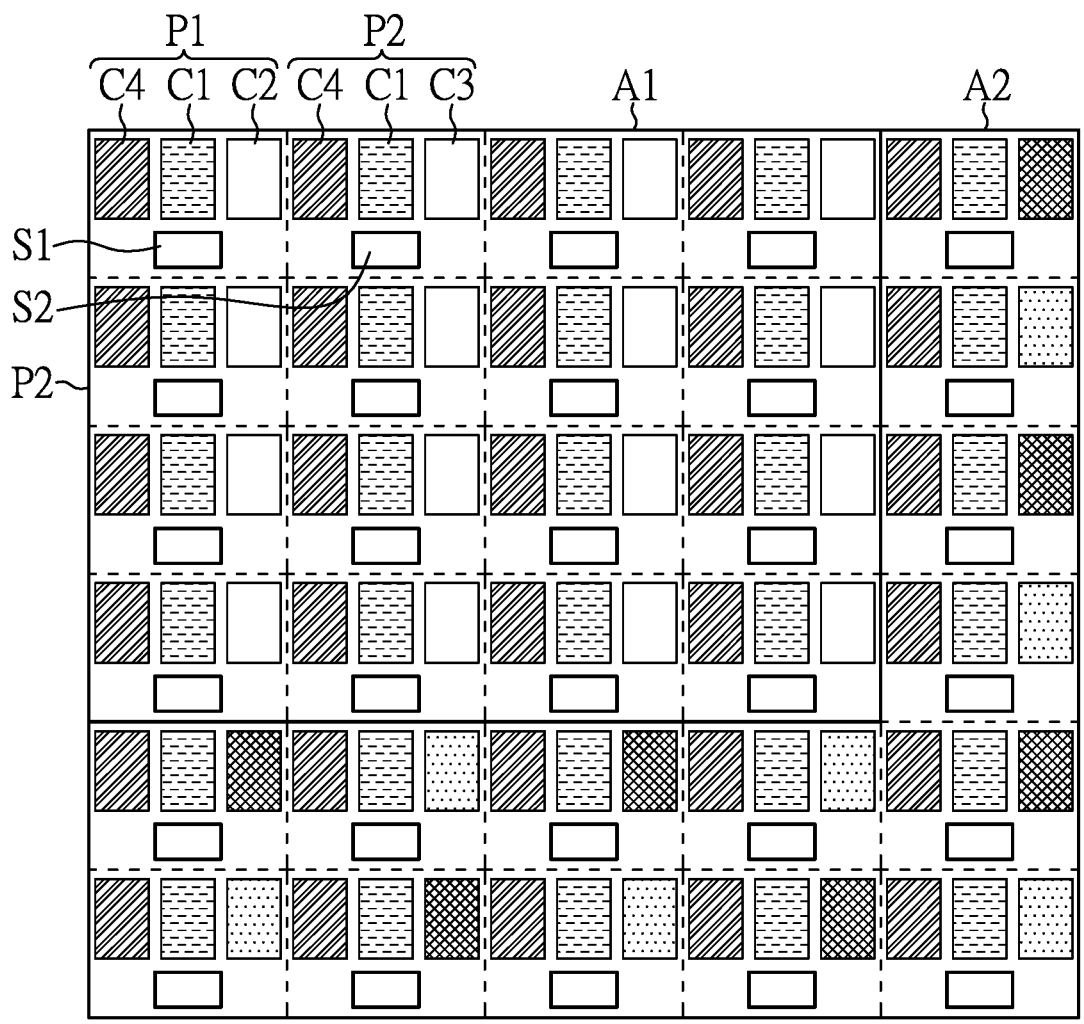
FIG. 4 is a schematic view showing a display device in a fingerprint recognition mode according to one embodiment of the present disclosure.

FIG. 4 is a schematic view showing a display device in a fingerprint recognition mode. In FIG. 4, the enabled sub-pixel regions are present with patterns identical to those shown in FIG. 1, and the disabled sub-pixel regions are present with blank.

Taking the first pixel P1 and the second pixel P2 for explanation, when the display device 100 is in the fingerprint recognition mode, referring to FIG. 4, the first sub-pixel region C1 in the first pixel region P1 is enabled, the first sub-pixel region C1 in the second pixel region P2 is enabled, the second sub-pixel region C2 in the first pixel region P1 is disabled, and the third sub-pixel region C3 in the second pixel region P2 is disabled. According to some embodiments, the fourth sub-pixel region C4 in the first pixel region P1 and the fourth sub-pixel region C4 in the second pixel region P2 are enabled. The first sub-pixel region C1 can be of green color, the second sub-pixel region C2 can be of blue color, and the fourth sub-pixel region C4 can be of red color. The third sub-pixel region C3 can be of a color brighter than green and blue, for example, of white color. According to some embodiments, in the display device, the enabled first sub-pixel regions C1 and the enabled fourth sub-pixel regions C4 in the first pixel region P1 and in the second pixel region P2 can be controlled to be enabled in the same gray level, or in the same brightness. In this way, the light emitted from the first pixel P1 and the light emitted from second pixel P2 can be the same. Thus, the recognition accuracy of the display device can be improved.

Referring to FIG. 4, according to some embodiments, the first sub-pixel regions C1 can be of green color, the second sub-pixel regions C2 can be of blue color, the third sub-pixel regions C3 can be of white color, and the fourth sub-pixel regions C4 can be of red color. When the display device is in the fingerprint recognition mode, in the recognition area A1, the first sub-pixel regions C1 with green color in the first pixel region P1 and in the second pixel region P2 are enabled, the fourth sub-pixel regions C4 with red color in the first pixel region P1 and in the second pixel region P2 are enabled, and the second sub-pixel region C2 with blue color in the first pixel region P1 and the third sub-pixel region C3 with white color in the second pixel region P2 are disabled. Thus, the light received by the first fingerprint recognition unit S1 in the first pixel region P1 includes red light and green light, and the light received by the second fingerprint recognition unit S2 in the second pixel region P2 includes red light and green light. Thus, the fingerprint recognition units disposed in different pixels can receive the same light, that is, the same color of light and/or the same brightness of light. Thus, the recognition accuracy of the display device can be improved.

Figure 5:
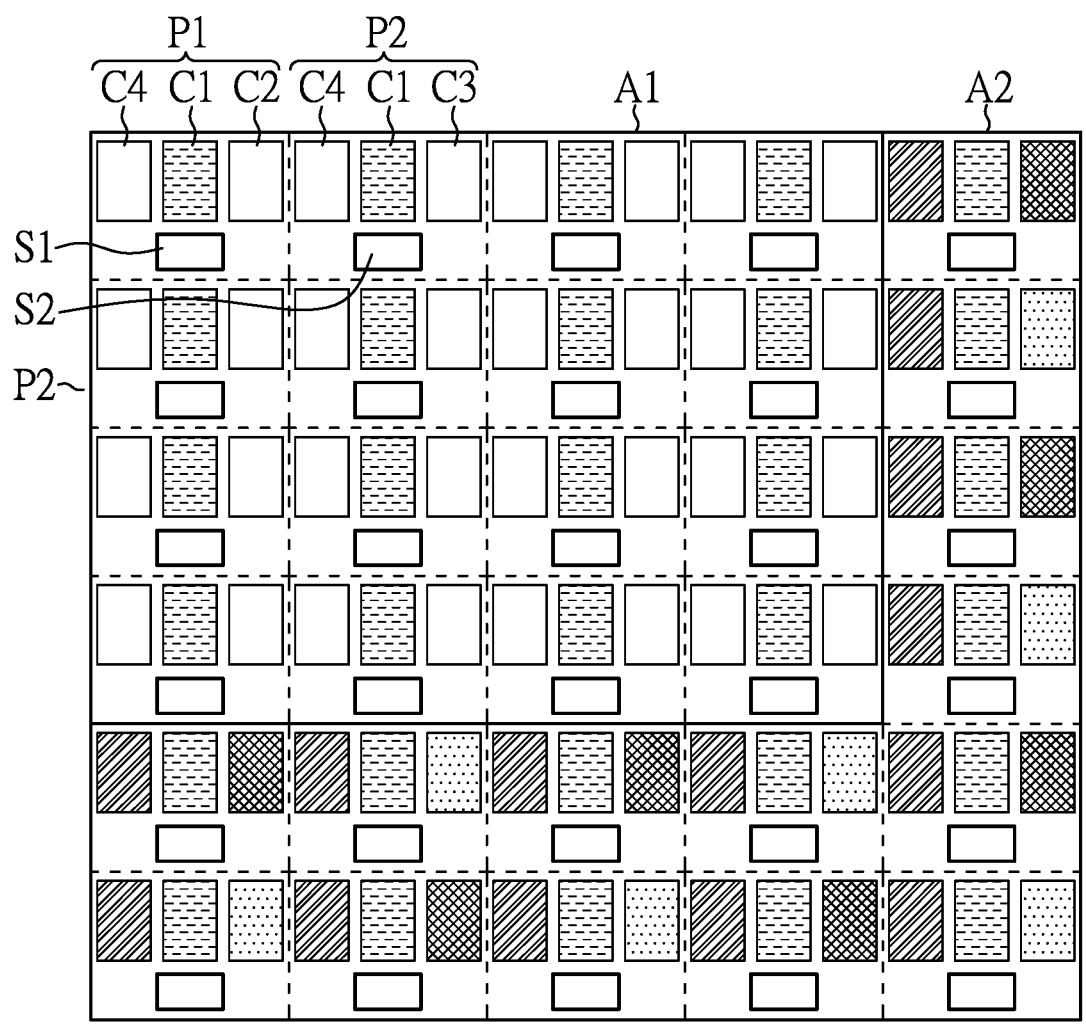
FIG. 5 is a schematic view showing a display device in a fingerprint recognition mode according to another embodiment of the present disclosure.

FIG. 5 is a schematic view showing a display device in a fingerprint recognition mode according to another embodiment of the present disclosure. The display device and the process for the fingerprint recognition of the present embodiment are similar to those illustrated before, except for the following differences. In FIG. 5, the enabled sub-pixel regions are present with patterns identical to those shown in FIG. 1, and the disabled sub-pixel regions are present with blank. The main difference of FIG. 5 from FIG. 4 is that in FIG. 5, the fourth sub-pixels C4 in the first pixel P1 and in the second pixel P2 are disabled.

Taking the first pixel P1 and the second pixel P2 for explanation, when the display device is in the fingerprint recognition mode, referring to FIG. 5, only the first sub-pixel regions C1 are enabled. Specifically, the first sub-pixel region C1 in the first pixel region P1 is enabled, the first sub-pixel region C1 in the second pixel region P2 is enabled, the second sub-pixel region C2 in the first pixel region P1 is disabled, and the third sub-pixel region C3 in the second pixel region P2 is disabled. According to some embodiments, the fourth sub-pixel region C4 in the first pixel region P1 and the fourth sub-pixel region C4 in the second pixel region P2 are disabled. According to some embodiments, the first sub-pixel region C1 can be of green color, the second sub-pixel region C2 can be of blue color, and the fourth sub-pixel region C4 can be of red color. The third sub-pixel region C3 can be of a color brighter than green and blue, for example, of white color. According to some embodiments, in the display device, the enabled first sub-pixel regions C1 in the first pixel region P1 and in the second pixel region P2 can be controlled to be enabled in the same gray level, or in the same brightness. In this way, the light emitted from the first pixel P1 and the light emitted from second pixel P2 can be the same. Thus, the recognition accuracy of the display device can be improved.

According to some embodiments, referring to FIG. 5, the first sub-pixel region C1 can be of red color, the second sub-pixel region C2 can be of blue color, the third sub-pixel regions C3 can be of white color, and the fourth sub-pixel regions C4 can be of green color. When the display device is in the fingerprint recognition mode, only the first sub-pixel regions C1 (red sub-pixel regions) are enabled. Specifically, the fourth sub-pixel region C4 with green color in the first pixel region P1 and the fourth sub-pixel region C4 with green color in the second pixel region P2 are disabled, the second sub-pixel region C2 with blue color in the first pixel region P1 is disabled, and the third sub-pixel region C3 with white color in the second pixel region P2 is disabled. In this way, similar to the above descriptions, the light emitted from the first pixel region P1 and the light emitted from second pixel region P2 can be controlled to be the same. Thus, the recognition accuracy of the display device can be improved. The arrangement of sub-pixels in one pixel is not limited. According to some embodiments, the first pixel region P1 can include a fourth sub-pixel regions C4 with green color, a first sub-pixel regions C1 with red color and a second sub-pixel region C2 with blue color arranged along a first direction, and the second pixel region P2 can include a fourth sub-pixel regions C4 with green color, a first sub-pixel regions C1 with red color and a third sub-pixel region C3 with white color arranged along the first direction. According to some embodiments, the first pixel region P1 can include a first sub-pixel regions C1 with red color, a fourth sub-pixel regions C4 with green color and a second sub-pixel region C2 with blue color arranged along a first direction, and the second pixel region P2 can include a first sub-pixel regions C1 with red color, a fourth sub-pixel regions C4 with green color and a third sub-pixel region C3 with white color arranged along the first direction. However, the arrangement of red sub-pixel regions, green sub-pixel regions, blue sub-pixel regions and white sub-pixel regions are not limited thereto, and can be adjusted according to the need.

When the display device is in the fingerprint recognition mode, a brightness of the first pixel region P1 and a brightness of the second pixel region P2 in the area A1 can be substantially the same. For example, the difference between the brightness of the first pixel region P1 and the brightness of the second pixel region P2 in the area A1 is within ±10%, ±5%, ±3%, ±2%, ±1% or ±0.5%.

When the display device is in the fingerprint recognition mode, the plurality of first sub-pixel regions C1, the plurality of second sub-pixel regions C2, the plurality of third sub-pixel regions C3 and the plurality of fourth sub-pixel regions C4 disposed in the non-recognition area A2 are respectively enabled or disabled according to an image to be displayed.

In should be noted that, when the display device is in the fingerprint recognition mode, in the non-recognition area A2 shown in FIG. 4 and FIG. 5, all the sub-pixel regions are labeled as enabled to distinguish the difference between the recognition area A1 and the non-recognition area A2 only for ease of explanation. However, actually, the sub-pixel regions in the non-recognition area A2 should be respectively disabled or enabled according to the image to be displayed.

In the display device of the present embodiment, the fourth sub-pixel region C4, the first sub-pixel region C1 and the second sub-pixel region C2 are arranged along a direction, and the fourth sub-pixel region C4, the first sub-pixel region C1 and the third sub-pixel region C3 are also arranged along the same direction. In addition, the first fingerprint recognition unit S1 is disposed to be adjacent to the first sub-pixel region C1, and the second fingerprint recognition unit S2 is disposed to be adjacent to the first sub-pixel region C1. However, the arrangement of the first sub-pixel regions, the second sub-pixel regions, the third sub-pixel regions, the fourth sub-pixel regions and the fingerprint recognition units is not limited thereto. For example, in another embodiment of the present disclosure, the fourth sub-pixel region C4, the first sub-pixel region C1 and the second sub-pixel region C2 and the first fingerprint recognition unit S1 may be arranged in a 2×2 array, and the fourth sub-pixel region C4, the first sub-pixel region C1 and the third sub-pixel region C3 and the second fingerprint recognition unit S2 may also be arranged in a 2×2 array.

In addition, in the present embodiment, a ratio of the number of the first pixel regions P1 to the number of the second pixel regions P2 can be about 1:1. However, the present disclosure is not limited thereto. In another embodiment of the present disclosure, this ratio may not be 1:1 and may be adjusted according to the need, for example, the desired brightness of the display device.

In the present embodiment, the fingerprint recognition units (including the first fingerprint recognition unit S1 and the second fingerprint recognition unit S2) may respectively a photo sensor, a visible light sensor, a photodiode sensor, a transistor sensor, or combinations thereof.

In some embodiments, the fingerprint recognition units may be more sensitive to green light. In this case, the fingerprint recognition units can be disposed closer to the green sub-pixel regions. For example, in the first pixel region P1, when the first color of the first sub-pixel region C1 is green, the first fingerprint recognition unit S1 can be disposed closer to the first sub-pixel region C1 than the second sub-pixel region C2. In some embodiments, in the first pixel region P1, the first fingerprint recognition unit S1 can be disposed closer to the first sub-pixel region C1 than the fourth sub-pixel region C4. In some embodiments, in the second pixel region P2, when the first color of the first sub-pixel region C1 is green, the second fingerprint recognition unit S2 can be disposed closer to the first sub-pixel region C1 than the fourth sub-pixel region C4, and also disposed closer to the first sub-pixel region C1 than the third sub-pixel region C3. However, the present disclosure is not limited thereto; and the disposition of the fingerprint recognition units may be adjusted according to the need, for example, the types of the fingerprint recognition units.

Herein, the first fingerprint recognition unit S1/the second fingerprint recognition unit S2 closer to the first sub-pixel region C1 than the second sub-pixel region C2/the third sub-pixel region C3/the fourth sub-pixel region C4 can be defined by the center of the first fingerprint recognition unit S1/the second fingerprint recognition unit S2 and the centers of the first sub-pixel region C1 and the second sub-pixel region C2/the third sub-pixel region C3/the fourth sub-pixel region C4. For example, in the first pixel P1, the center of the first fingerprint recognition unit S1 is closer to the center of the first sub-pixel region C1 than the centers of the second sub-pixel region C2 and the fourth sub-pixel region C4. In addition, in the second pixel P2, the center of the second fingerprint recognition unit S2 is closer to the center of the first sub-pixel region C1 than the centers of the third sub-pixel region C3 and the fourth sub-pixel region C4.

Figure 6:
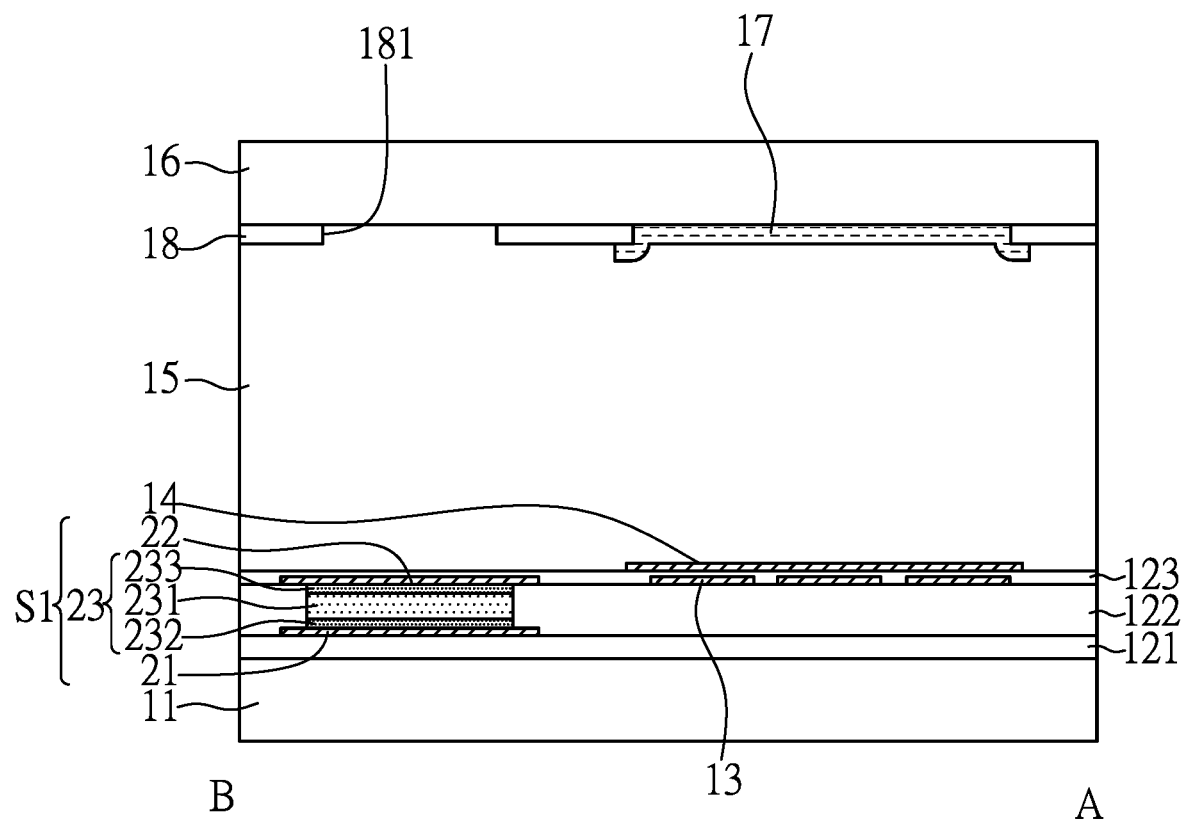
FIG. 6 is a schematic cross-sectional view of a display device along a line A-B indicated in FIG. 2.

FIG. 6 is a schematic cross-sectional view of a display device along a line A-B indicated in FIG. 2.

The display device of the present embodiment comprises: a first substrate 11; a first insulating layer 121 disposed on the first substrate 11; the first fingerprint recognition unit S1 disposed on the first insulating layer 121; a second insulating layer 122 disposed on the first insulating layer 121; a first transparent electrode 13 disposed on the second insulating layer 122; a third insulating layer 123 disposed on the first fingerprint recognition unit S1 and the first transparent electrode 13; and a second transparent electrode 14 disposed on the third insulating layer 123.

In addition, the display device of the present embodiment further comprises: a second substrate 16; a light shielding layer 18 disposed on the second substrate 16; and a color filter layer 17 disposed on the second substrate 16. The display device of the present embodiment further comprises: a display layer 15 disposed between the first substrate 11 and the second substrate 16.

Herein, the first substrate 11 and the second substrate 16 may respectively be a non-flexible substrate, a flexible substrate, a thin film or a combination thereof. The materials of the first substrate 11 and the second substrate 16 may respectively comprise glass, quartz, silicon wafer, sapphire, polycarbonate (PC), polyimide (PI), polypropylene (PP), polyethylene terephthalate (PET), other suitable material, or a combination thereof; but the present disclosure is not limited thereto. When the first substrate 11 or the second substrate 16 is a thin film, the thin film may be a water barrier film or an encapsulating water barrier film formed by laminated inorganic-organic-inorganic (I-O-I) insulating layers. In addition, the first insulating layer 121, the second insulating layer 122 and the third insulating layer 123 respectively include organic material or inorganic material, for example, silicon oxide, silicon oxynitride, silicon nitride, aluminum oxide, resin, polymer, photoresist, or a combination thereof; but the present disclosure is not limited thereto. The first transparent electrode 13 and the second transparent electrode 14 may respectively include a transparent conductive metal oxide such as ITO (indium tin oxide), IZO (indium zinc oxide), ITZO (indium tin zinc oxide), IGZO (indium gallium zinc oxide), AZO (aluminum zinc oxide) or a combination thereof; but the present disclosure is not limited thereto.

In the present embodiment, the first fingerprint recognition unit S1 is a photodiode for sensing visible light, which comprises an active layer 23 comprising amorphous silicon. Herein, the first fingerprint recognition unit S1 comprises: a first electrode 21; a second electrode 22; and an active layer 23 disposed between the first electrode 21 and the second electrode 22. The active layer 23 comprises: an intrinsic semiconductor region 231; an n$^+$ region 232 disposed between the first electrode 21 and the intrinsic semiconductor region 231; and a p$^+$ region 233 disposed between the second electrode 22 and the intrinsic semiconductor region 231. Herein, the material of the first electrode 21 may comprise, but is not limited to, copper (Cu), aluminum (Al), molybdenum (Mo), tungsten (W), gold (Au), chromium (Cr), nickel (Ni), platinum (Pt), titanium (Ti), Cu alloy, Al alloy, Mo alloy, W alloy, Au alloy, Cr alloy, Ni alloy, Pt alloy, Ti alloy, other suitable metal, a combination thereof, or other conductive material with good conductivity or small resistance. Herein, the first electrode 21 may have a singlelayered or multi-layered structure. In addition, the second electrode 22 may be a transparent electrode, which may include a transparent conductive metal oxide such as ITO, IZO, ITZO, IGZO, AZO or a combination thereof; but the present disclosure is not limited thereto.

In the present embodiment, the light shielding layer 18 includes a plurality of openings 181, the color filter layer 17 is disposed correspondingly to one of the openings 181, and the first fingerprint recognition unit S1 is disposed correspondingly to one of the openings 181. In particular, the first fingerprint recognition unit S1 is exposed from one of the openings 181. However, the present disclosure is not limited thereto, as long as the active layer 23 of the first fingerprint recognition unit S1 can be exposed from the opening 181 to receive the light from the second substrate 16. In another embodiment of the present disclosure, the first fingerprint recognition unit S1 may be disposed correspondingly to two or more of the openings 181. In further another embodiment of the present disclosure, two or more first fingerprint recognition units S1 may be disposed correspondingly to one of the openings 181.

In the present embodiment, the structure of the second fingerprint recognition unit S2 shown in FIG. 1 is similar to the structure of the first fingerprint recognition unit S1 illustrated above, and is not described again. In addition, the LCD device shown in FIG. 6 is illustrated as an example of the display device of the present disclosure, but the present disclosure is not limited thereto. Even not shown in the figure, the OLED display device, the micro LED display device, the mini LED display device or the QD LED display device may also be used in the present disclosure.

In the display device of the present embodiment, referring to FIG. 1, the first fingerprint recognition unit S1 is disposed in the first pixel region P1 and the second fingerprint recognition unit S2 is disposed in the second pixel region P2, so the aperture ratios of the first pixel region P1 and the second pixel region P2 are decreased, resulting in the brightness of the display device insufficient. Thus, the second sub-pixel regions C2 with the second color can be replaced by the third sub-pixel regions C3 with the third color brighter than the second color in the second pixel region P2 to increase the brightness of the display device without increasing the power consumption of the display device. However, if all the sub-pixels in the first pixel region P1 and the second pixel region P2 are enabled in the fingerprint recognition mode, the light received by the first fingerprint recognition unit S1 and the light received by the second fingerprint recognition unit S2 are different, because the second sub-pixel region C2 in the first pixel region P1 and the third sub-pixel region C3 in the second pixel region P2 are with different color. This light difference may cause the light received by the first fingerprint recognition unit S1 or the light received by the second fingerprint recognition unit S2 to be misjudged as a noise, resulting in the poor fingerprint recognition.

In the method for the fingerprint recognition of the present embodiment, the second sub-pixel regions C2 in the first pixel region P1 and the third sub-pixel regions C3 in the second pixel region P2 can be disabled in the fingerprint recognition mode, so the issue that the light difference caused by the light emitted from the second sub-pixel regions C2 and the third sub-pixel regions C3 can be reduced. Therefore, the accuracy of the fingerprint recognition can be improved.

In the present embodiment, the display device may be a display device, a touch display device, a curved display device or a free shape display device, but the present disclosure is not limited thereto. The display device of the present disclosure may be a bendable or a flexible display device. The display device may include, for example, a tiled display device, but the present disclosure is not limited thereto. The display device of the present disclosure may be a combination of the aforesaid devices, but the present disclosure is not limited thereto. In addition, the shapes of the display device of the present disclosure is not particularly limited, and may be rectangle, circular, polygon, a shape with curved edges or other suitable shapes, but the present disclosure is not limited thereto. The display device of the present disclosure may comprise a driving system, a control system, a light source system, a shelving system or other peripheral system to support the display device or the tiled display device.

In the present embodiment, the display device may comprise a display layer, which may comprise liquid crystals (LCs), organic light-emitting diodes (OLEDs), quantum dots (QDs), fluorescence material, phosphor material, light-emitting diodes (LEDs) or other display medium; but the present disclosure is not limited thereto. The LEDs may comprise a micro LED (micro light-emitting diode), a mini LED (mini light-emitting diode) according to the size thereof, or a quantum dot (QD) LED such as QLED or QDLED. Hereinafter, a liquid crystal display device is described below, but the present disclosure is not limited thereto.

In conclusion, in the method for fingerprint recognition of the present disclosure, when the display device is in the fingerprint recognition mode, and a finger of a subject is disposed or touched on a recognition area of the display device, at least one first sub-pixel region is enabled, and at least one of the second sub-pixel regions and the third sub-pixel regions is disabled. According to some embodiments, in the recognition area, the green sub-pixel regions are enabled, and the blue sub-pixel regions and the white sub-pixel regions are disabled. According to some embodiments, in the recognition area, the green sub-pixel regions in the first pixel region and in the second pixel region are enabled, and the blue sub-pixel regions in the first pixel region and the white sub-pixel regions in the second pixel region are disabled. Thus, according to some embodiments, the light received by the first fingerprint recognition unit in the first pixel region and the light received by the second fingerprint recognition unit in the second pixel region can be controlled to be similar or the same. Hence, according to some embodiments, the accuracy of the fingerprint recognition of the display device may be improved.

Although the present disclosure has been explained in relation to its embodiment, it is to be understood that many other possible modifications and variations can be made without departing from the spirit and scope of the disclosure as hereinafter claimed.

What is claimed is:

1. A method for recognizing a fingerprint of a subject, comprising the following steps:
providing a display device, wherein the display device comprises: a plurality of fingerprint recognition units, a plurality of first sub-pixel regions with a first color, a plurality of second sub-pixel regions with a second color, a plurality of third sub-pixel regions with a third color, and a plurality of fourth sub-pixel regions with a fourth color, wherein the first color, the second color, the third color and the fourth color are different;

defining a recognition area of the display device by disposing a finger of the subject on the display device when the display device is in a fingerprint recognition mode;

wherein the display device comprises a first pixel region and a second pixel region disposed in the recognition area, and the first pixel region is adjacent to the second pixel region;

wherein the first pixel region comprises a first fingerprint recognition unit of the plurality of fingerprint recognition units, a first sub-pixel region of the plurality of first sub-pixel regions, a second sub-pixel region of the plurality of second sub-pixel regions, and a fourth sub-pixel region of the plurality of fourth sub-pixel regions;

wherein the second pixel region comprises a second fingerprint recognition unit of the plurality of fingerprint recognition units, a first sub-pixel region of the plurality of first sub-pixel regions, a third sub-pixel region of the plurality of third sub-pixel regions, and a fourth sub-pixel region of the plurality of fourth sub-pixel regions; and wherein when the display device is in the fingerprint recognition mode, the method comprises enabling the first sub-pixel region and the fourth sub-pixel region of the first pixel region, enabling the first sub-pixel region and the fourth sub-pixel region of the second pixel region, disabling the second sub-pixel region of the first pixel region, and disabling the third sub-pixel region of the second pixel region.

2. The method of claim 1, wherein when the display device is in the fingerprint recognition mode, the method comprises enabling the first sub-pixel region in the first pixel region and enabling the first sub-pixel region in the second pixel region with the same brightness.

3. The method of claim 1, wherein the first color is green.

4. The method of claim 1, wherein the first color is red.

5. The method of claim 1, wherein the third color is white.

6. The method of claim 1, wherein the display device includes a non-recognition area outside the recognition area, and the method comprises:

enabling or disabling the plurality of first sub-pixel regions, the plurality of second sub-pixel regions, and the plurality of third sub-pixel regions disposed in the non-recognition area respectively according to an image to be displayed when the display device is in the fingerprint recognition mode.

* * * * *